United States Patent
Hoffman et al.

[11] 3,851,234
[45] Nov. 26, 1974

[54] CONTROL SYSTEM FOR OBTAINING AND USING THE OPTIMUM SPEED TORQUE CHARACTERISTIC FOR A SQUIRREL CAGE INDUCTION MOTOR WHICH GUARANTEES A NON-SATURATING MAGNETIZING CURRENT

[75] Inventors: Robert E. Hoffman, Erie, Pa.; John A. Cline, Pittsfield, Mass.; Christopher S. Fuselier, Pittsfield, Mass.; John D. D'Atre, Pittsfield, Mass.

[73] Assignee: General Electric Company

[22] Filed: May 9, 1973

[21] Appl. No.: 358,509

[52] U.S. Cl.................. 318/227, 318/230, 318/231
[51] Int. Cl. ............................................. H02p 5/40
[58] Field of Search................... 318/227, 230, 231

[56] References Cited
UNITED STATES PATENTS

| | | | |
|---|---|---|---|
| 3,372,323 | 3/1968 | Guyeska | 318/231 X |
| 3,477,002 | 11/1969 | Campbell | 318/231 X |
| 3,500,158 | 3/1970 | Landau et al. | 318/227 |
| 3,512,067 | 5/1970 | Landau | 318/227 |
| 3,593,083 | 7/1971 | Blaschke | 318/231 X |
| 3,671,831 | 6/1972 | Chausse et al. | 318/227 |
| 3,675,099 | 7/1972 | Johnston | 318/227 |
| 3,769,564 | 10/1973 | Rettig | 318/227 |

Primary Examiner—G. Z. Rubinson
Attorney, Agent, or Firm—Francis K. Richwine

[57] ABSTRACT

This invention relates to improvements in electromechanical devices, and specifically provides apparatus for obtaining the optimum constant flux speed-torque characteristic for a squirrel cage induction motor. The system of this invention further provides means by which the optimum speed-torque characteristic is used as a dynamic limit while guaranteeing a non-saturating magnetizing current in the magnetic core. This invention further uses the optimum constant flux speed-torque characteristic to provide improved torque capability of a squirrel cage induction motor by means of independent constraint of slip frequency and voltage applied to the stator circuit of the motor.

4 Claims, 6 Drawing Figures

SLIP FREQUENCY $$\Delta_P = \frac{R_r}{n(L_r - M)}$$

$$T_M = \frac{K n M^2 I_M^2}{2(L_r - M)}$$

$C_1 = I_M^2 R_s^2 R_r^2$ $C_2 = I_M^2 R_s^2 n^2 L_r^2$ $C_3 = I_M^2 R_s n^2 2M^2 R_r$ $C_4 = I_M^2 R_r^2 n^2 L_s^2$ $C_5 = I_M^2 n^4 [M^2 - L_s L_r]^2$ $C_6 = R_r^2$ $C_7 = n^2 [L_r - M]^2$

CONTROL SYSTEM FOR OBTAINING AND USING THE OPTIMUM SPEED TORQUE CHARACTERISTIC FOR A SQUIRREL CAGE INDUCTION MOTOR WHICH GUARANTEES A NON-SATURATING MAGNETIZING CURRENT

INTRODUCTION

This invention relates to improvements in electromechanical devices, and specifically provides apparatus for obtaining and using the optimum constant flux speed-torque characteristic for a squirrel cage induction motor.

BACKGROUND OF THE INVENTION

1. Field of Invention

While utilizing an induction motor in applications where variation in motor speed is required and/or variation in motor torque is required, it becomes necessary to operate the motor at synchronous frequencies and-/or slip frequencies other than those for which the motor was designed. For instance, in order to respond quickly to incremental changes in the speed of the rotor, it becomes necessary to accelerate or decelerate the motor as rapidly as possible at slip frequencies much larger than normal operating slip frequencies. Operation in these regions can lead to saturation of the motor's magnetic core, excessive motor heating, and sluggish motor response. The regions of proper motor operation can be identified and the motor constrained to operate within these regions by independently effecting limits on the slip frequency and the voltage applied to the stator windings.

2. The Prior Art

Although the standard for the art is to not provide motor controls which will limit operation so as to preclude motors from operating with magnetic saturation and its consequent core losses, it has been known that a constant line current limit will provide some protection against saturations with large values of slip frequency. However, these systems do not afford protection at slip frequency values less than that which corresponds to the point at which the constant line current happens to provide exactly the maximum non-saturating magnetizing current. Others, including J. C. Guyeska, U.S. Pat. No. 3,372,323 issued Mar. 5, 1968, have placed arbitrary slip frequency limits on motors but generally the slip frequency limits selected do not correlate with either operating points or with a constant magnetizing current value. There has been at least one other suggestion, Page 22, B. R. Pelly, "Thyristor Phase-Controlled Converters and Cycloconverters," John Wiley & Sons, New York 1971, that if the frequency and voltage of the power source for the motor control can be controlled, there is no need to operate a motor or generator outside that portion of the torque-slip characteristic having a positive slope. Pelly recognizes a desire to operate at a constant magnetizing current but his solution to the problem is limited to situations of small torque variation at high speeds. Pelly proposes to operate a motor at maximum constant flux without complete recognition of the fact that motor instability can, and does, occur at various speeds and slip frequencies when a motor is operated at maximum constant flux. Similar problems of instability occur in motor operation at constant flux which is not the maximum. To afford protection for the motor or generator at all torque and speed conditions it is necessary to properly limit the applied voltage and the slip frequency.

SUMMARY OF THE INVENTION

In the case of a voltage limiter, the desired voltage and synchronous frequency (as generated by a control system) are applied to the limiter circuitry. The synchronous frequency and the actual slip frequency are used by a voltage function generator to determine the voltage magnitude necessary to produce rated air gap flux. This voltage, if applied to the motor at the above-mentioned synchronous and slip frequencies, will produce the maximum, non-saturating magnetizing current in the motor. This generated voltage is compared to the desired control voltage. If the control voltage is less than or equal to the limit voltage, it is applied directly to the motor drive circuitry. If the control voltage is greater than the limit voltage, then the limit voltage is applied to the motor drive circuitry. The motor can thus be constrained to operate in regions of non-magnetic saturation.

In the case of a slip frequency limiter, the desired synchronous frequency and the actual rotor frequency are applied to the limiter circuitry. The limiter is based on the pull-out torque characteristic of the motor. At any rotor speed there is a slip frequency that corresponds to the constant flux pull-out torque point on the motor's speed torque characteristic. If the motor is operated at a slip frequency larger than the slip frequency corresponding to the pull-out torque point, the motor output torque capability is lessened and the motor slows down. When the motor slows down, the slip frequency becomes larger; and the torque lower. This continues until the motor stalls. The limiter generates a maximum synchronous frequency which is the actual rotor frequency added to the slip frequency corresponding to the pull-out torque point. This synchronous frequency is compared to the control synchronous frequency. If the control synchronous frequency is less than or equal to the limit synchronous frequency, then the control synchronous frequency is applied directly to the motor drive circuitry and to the voltage limit circuitry. If the control synchronous frequency is greater than the limit synchronous frequency, then the limit synchronous frequency is applied directly to the motor drive circuitry and to the voltage limit circuitry. Thus the motor can be constrained to operate in regions of slip frequency below the pull-out slip frequency point.

In the case of acceleration or deceleration or any situation requiring increased torque, the motor can be forced to operate at the synchronous frequency limit with the proper limit voltage which guarantees a non-saturated magnetizing current. This voltage and frequency will insure non-saturated motor operation at the maximum torque level available from the motor.

Therefore, it is one object of the invention to obtain the optimum speed-torque characteristic for an induction motor that guarantees a non-saturating magnetizing current in the motor. Another object of this invention is to use the voltage necessary to produce the above-mentioned optimum speed-torque characteristic as a limit for the desired control voltage.

It is a further object of this invention to use the slip frequency corresponding to the constant flux pull-out torque point to generate a synchronous frequency limit for the desired control synchronous frequency.

It is still a further object of this invention to obtain improved acceleration or deceleration from the motor or to obtain maximum torque under constant speed operations by forcing it to operate at the above-mentioned synchronous frequency and voltage limit points.

DESCRIPTION OF A PREFERRED EMBODIMENT

Figure 1:
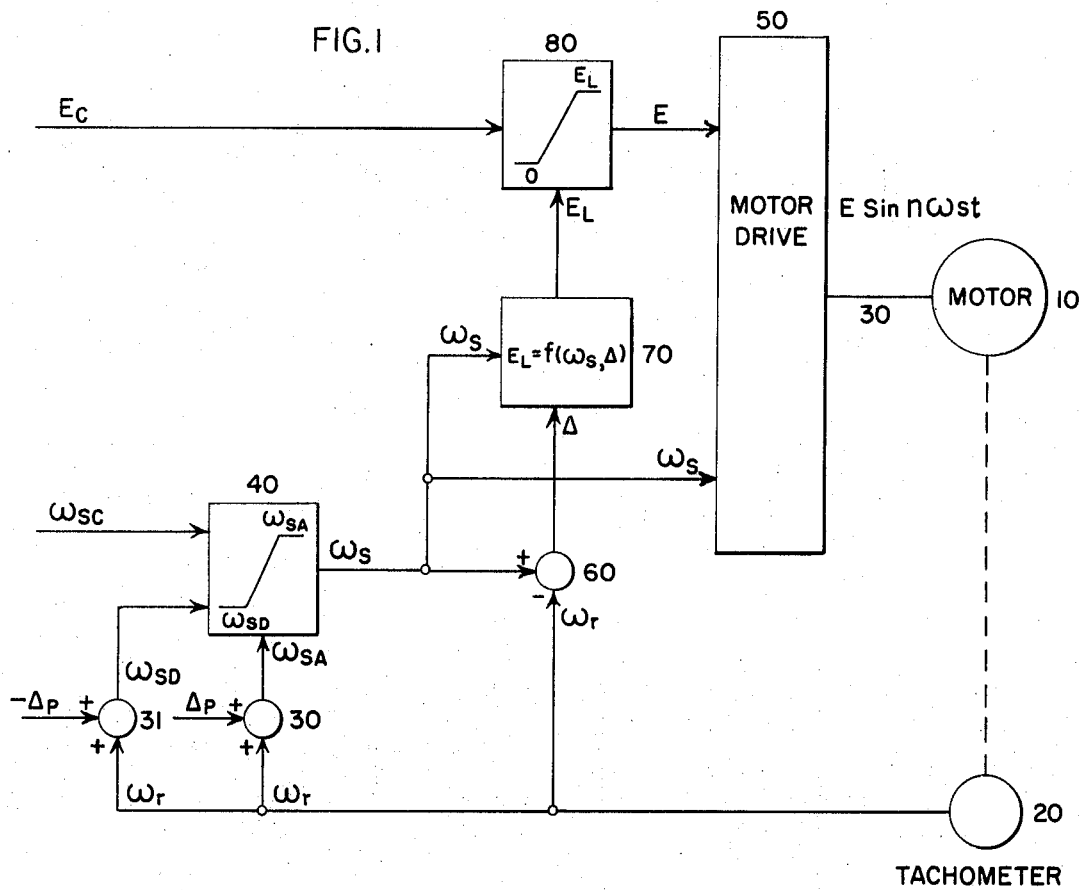
FIG. 1 shows a block diagram of a system where synchronous frequency is limited by the pull-out torque point slip frequency and the voltage magnitude is limited by a voltage which is guaranteed not to produce a saturating magnetizing current.
Figure 6:
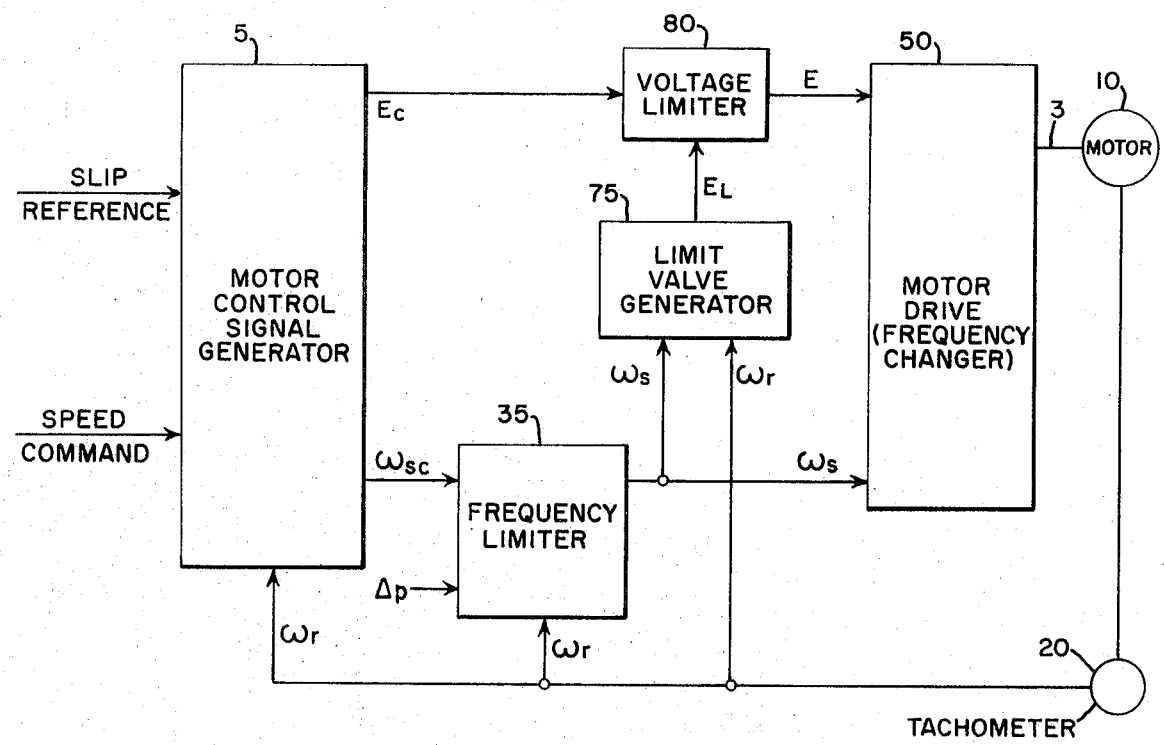
FIG. 6 is a block diagram showing how the present invention is used with the prior art.

The control system of FIG. 1 is an implementation of the invention which may be used to enhance control of a motor 10 by limiting the control signals $E_C$ and $\omega_{sC}$ applied to the motor drive circuitry 50, wherein $E_C$ is a drive voltage amplitude signal and $\omega_{sC}$ is a frequency signal. Although this invention may be used with any prior art control system having control signals comparable to $E_C$ and $\omega_{sC}$, it is most directly applied to systems of the type disclosed by Guyeska, U.S. Pat. No. 3,372,323, Mar. 5, 1968, and by our copending application Ser. No. 326,449, filed Apr. 5, 1971. FIG. 6 shows the control system of FIG. 1 applied to the prior art as represented by our copending application where block 5 represents all of the signal processing circuitry of FIG. 1 of that application except motor 10, tachometer 20 and motor drive circuitry 40. By the same token as applied to Guyeska, 5 represents all of FIG. 1 of Guyeska except frequency changer 10, motor 12, and tachometer 16. In general the present invention provides for a further processing of control signals of the type previously applied in the art to motor control or frequency changer circuitry.

The true rotor speed $\omega_r$ of the motor is obtained by a tachometer 20 and is the same $\omega_r$ used, as indicated in FIG. 6, by Guyeska and in our copending application as a motor feedback signal used in combination with command signals for generating control signals of the type of $E_C$ and $\omega_{sC}$. The true rotor speed $\omega_r$ is provided to the frequency limiter and limit value generator portions of the embodiment described by means of an electrical connection to one input of a summing junction 30. The summing junction also receives a slip frequency signal $\Delta_p$ which is generated or preprogrammed for the control system to produce the slip frequency shown in FIG. 2 as corresponding to the pull-out torque point as more fully explained below. The summing junction 30 receives the limit slip frequency $\Delta_p$ and the true speed signal $\omega_r$ and adds them in deriving the limit synchronous frequency signal $\omega_{sA}$ for acceleration. The summing junction 31 receives the slip frequency signal $-\Delta_p$ and the true speed signal $\omega_r$ and adds them in deriving the limit synchronous frequency signal $\omega_{sD}$ for deceleration. The frequency limit circuit 40 also receives the control synchronous frequency $\omega_{sC}$ from another source, as for example a control signal generator as already used in the art as illustrated in FIG. 6, and produces an output $\omega_s$ which is the control synchronous frequency bounded by the accelerate/decelerate synchronous frequencies. In practice $\Delta_p$ and $-\Delta_p$ can be generated using any well known technique as, for example, a voltage divider. The synchronous frequency signal $\omega_s$ is applied directly to the motor drive circuitry 50. Junction 60 receives the synchronous frequency signal $\omega_s$ and the true rotor speed signal $\omega_r$ and substracts them subtracts form the actual motor slip frequency signal $\Delta$. The synchronous frequency signal $\omega_s$ and the true slip frequency signal $\Delta$ are applied to the voltage function generator circuit 70. The voltage function generator circuit 70 produces a voltage magnitude output $E_L$ that is a function of the synchronous frequency $\omega_s$ and the true slip frequency $\Delta$ and corresponds to the mathematics of Equation (1):

$$E_L = \left\{ \frac{[n^4\omega_s^2\Delta^2(L_sL_r-M^2)^2+n^2\omega_s^2R_r^2L_s^2+n^2\Delta^2R_s^2L_r^2 \\ +2n^2\omega_s\Delta M^2R_sR_r+R_s^2R_r^2]|I_M|^2}{n^2\Delta^2(M-L_r)^2+R_r^2} \right\}^{\frac{1}{2}} \quad (1)$$

Figure 2:
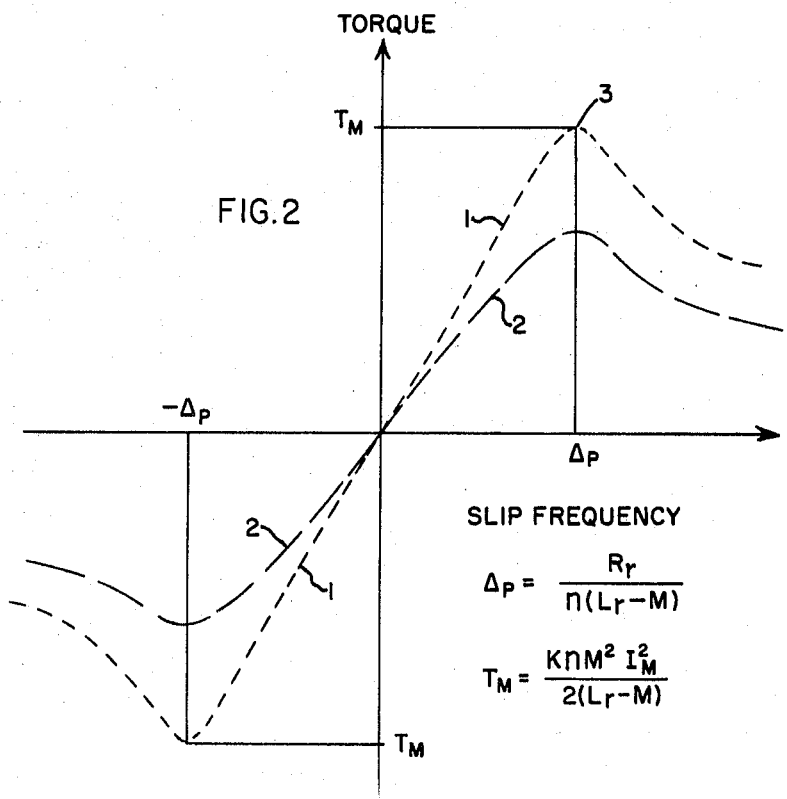
FIG. 2 shows an induction motor speed-torque curve for constant air gap flux and illustrates the slip frequencies corresponding to maximum torque for acceleration and deceleration.
Figure 3:
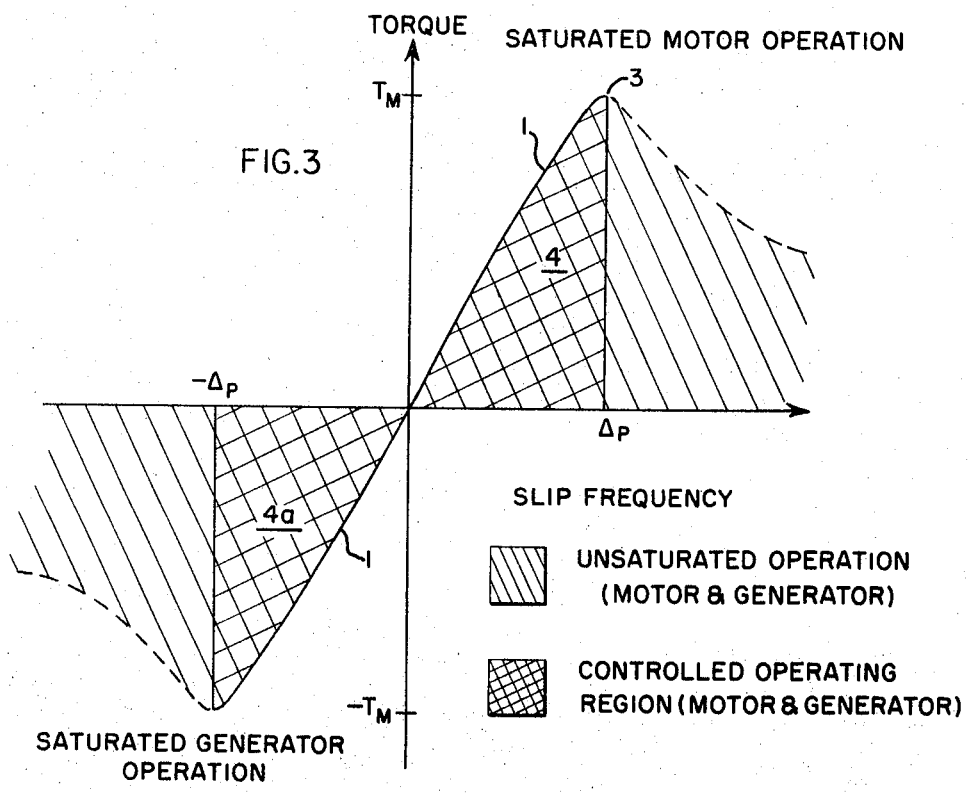
FIG. 3 shows the same speed-torque curve of FIG. 2 but illustrates the region of constrained motor operation.

To understand the derivation of the above equation and hence the operation of the circuit of FIG. 1; the torque versus slip frequency curve of FIGS. 2 and 3 must be consulted. This curve is obtained and is best understood by referring to the following set of equations which describe the operation of a squirrel cage induction motor of n poles and are given in the direct and quadrature axis coordinate system of the induction motor.

$$Jd\omega_r/dt = T_L - knM(i_{ds}i_{qr} - i_{dr}i_{qs})$$

$$L_s di_{ds}/dt + M di_{dr}/dt = e_{ds} + L_s n\omega i_{qs} + Mn\omega i_{qr} - R_s i_{ds}$$

$$L_s di_{qs}/dt + M di_{qr}/dt = e_{qs} - L_s n\omega i_{ds} - Mn\omega i_{dr} - R_s i_{qs}$$

$$L_r di_{qr}/dt + M di_{qs}/dt = -L_r n\Delta i_{dr} - Mn\Delta i_{ds} - R_r i_{qr}$$

$$L_r di_{dr}/dt + M di_{ds}/dt = +L_r n\Delta i_{qr} + Mn\Delta i_{qs} - R_r i_{dr}$$

where:
- $s$ denotes a stator quantity
- $r$ denotes a rotor quantity referred to the stator by the appropriate effective turns ratio
- $d$ denotes a direct axis quantity
- $q$ denotes a quadrature axis quantity
- $L$ inductance/phase, henries
- $M$ mutual inductance between rotor and stator/phase, henries
- $R$ resistance/phase, ohms
- $e$ applied voltage/phase, volts
- $i$ current, amps
- $\omega_s$ rotational rate of stator flux, radians/second
- $\omega_r$ rotational rate of rotor, radians/second
- $\Delta$; $\omega_s - \omega_r$ slip frequency, radians/second $n$ number of pole pairs in motor
$\omega_a; n\omega_s$ angular frequency of applied voltage
$T_L$ nominal load torque, foot-pounds
$J$ motor and load inertia, slug-feet$^2$
$k$ torque conversion factor for converting from electromagnetic torque units to foot-pounds When the motor operates at steady state conditions, the derivatives of $\omega_r$, $i_{ds}$, $i_{qs}$, $i_{dr}$, $i_{qr}$ are all equal to zero. The air gap flux is at all times proportional to the magnetizing current $I_M$ which is the phasor sum of the stator and reflected rotor current whose magnitude is given by Equation (3):

$$|I_M| = |I_s + I_r| = \sqrt{(i_{ds}^2 + i_{qs}^2) + (i_{dr}^2 + i_{qr}^2) + 2(i_{ds}i_{dr} + i_{qs}i_{qr})} \quad (3)$$

By applying the above conditions to the motor quantities and solving Equations (2) and (3) simultaneously the load torque as a function of slip frequency given by Equation (4) is obtained:

$$T_L = k\, R_r M^2 n^2\, \Delta / n^2 \Delta^2 (M - L_r)^2 + R_r^2\; |I_M|^2 \quad (4)$$

FIGS. 2 and 3 show torque characteristics as defined by Equation (4). Thus, Equation (5) is the magnitude of the motor voltage:

$$\sqrt{e_{ds}^2 + e_{qs}^2} = E_L = \left\{ \frac{[n^4\omega_s^2\Delta^2(L_sL_r - M^2)^2 + n^2\omega_s^2R_r^2L_s^2 + n^2\Delta^2R_s^2L_r^2 + 2n^2\omega_s\Delta M^2R_sR_r + R_s^2R_r^2]|I_M|^2}{n^2\Delta^2(M - L_r)^2 + R_r^2} \right\}^{\frac{1}{2}} \quad (5)$$

Differentiation of Equation (4) with respect to slip frequency and equating the results to zero defines a maximum torque value $T_M$:

$$T_M = KnM^2I_M^2/2(L_r - M) \quad (6)$$

Use of the maximum torque value $T_M$ in Equation (4) and solving for slip frequency $\Delta$ produces the slip frequency $\Delta_p$ for maximum torque which is the pull-out torque slip frequency as:

$$\Delta_p = R_r/n(L_r - M) \quad (7)$$

Since one objective of the invention is to maintain the magnetizing current at a constant value which does not saturate the magnetic core, the value of $I_M$ in Equation (5) can be held constant and at a value which is the maximum magnetizing current that will not saturate the magnetic core. This value of $I_M$ is represented by Curve 1 in FIG. 2. Alternatively $I_M$ can be held constant at any value sufficiently low to allow the core to be excited below saturation levels. An example of such lower value of $I_M$ is illustrated by Curve 2 in FIG. 2. This is possible since the current level which causes core saturation for a given magnetic core of a motor is readily obtainable by test or calculation, and the proper selection of magnetizing current $I_M$ gives a voltage magnitude $E_L$ according to Equation (5) which ensures that the core will not be saturated. When a slip frequency, $\Delta_p$, is utilized, such a voltage guarantees that the magnetic circuit is not saturated and the the optimum torque point (3 in FIG. 2) is obtained.

The voltage limit signal $E_L$ is applied to limit circuit 80. Limit circuit 80 also receives the control voltage signal $E_C$ also received from another source, as for example a control signal generator according to the prior art as illustrated in FIG. 6. The output of limit circuit 80 is the voltage amplitude signal $E$, which is the smaller of the two input signals $E_C$ and $E_L$.

Blocks 40 and 80 both represent circuitry used for constraining a signal to fall between dynamically varying upper and lower limit values. One possible implementation of this circuitry is explained in detail in our copending application Ser. No. 334,118 filed Feb. 20, 1973, "Dynamic Constraint of a Control Signal."

The voltage amplitude signal E is directly applied to the motor drive circuit 50. The motor drive circuit 50 derives a signal 3 applied to the stator of motor 10 which is a balanced phased sinusoidal varying voltage of a frequency corresponding to the applied frequency ($n\omega_s$) whose magnitude is a voltage corresponding to the voltage amplitude signal E.

This motor drive circuitry 50 is of any convenient type known in the art such as the type of circuitry described by Guyeska, U.S. Pat. No. 3,372,323 (Column 3, lines 51–55), as a frequency changer "of any convenient type which receives primary power and converts its frequency and voltage in accordance with signals received at a frequency control input and a voltage control input, respectively." This circuitry 50 is also the same kind of device as indicated by 40 in our copending application Ser. No. 326,449.

Figure 4:
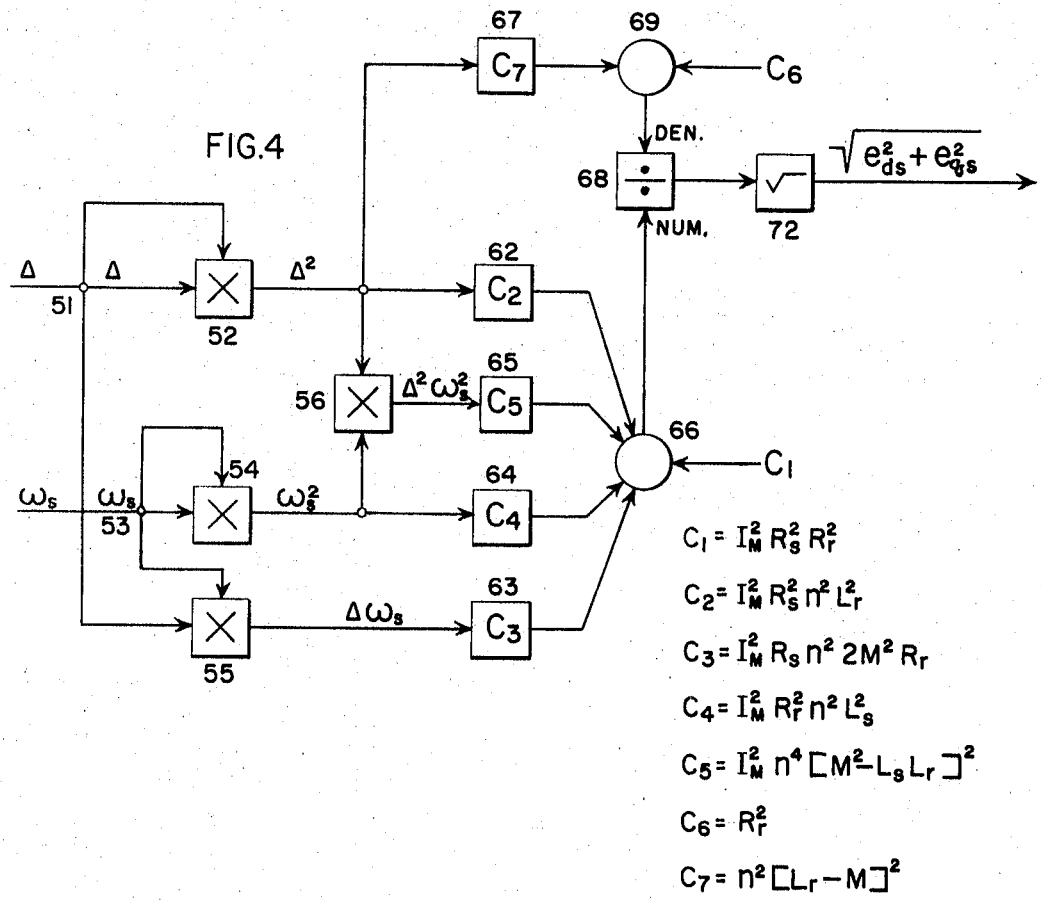
FIG. 4 shows a functional diagram of Block 70 as used in FIG. 1 to obtain a stator voltage as a function synchronous and slip frequencies.

FIG. 4 shows one embodiment of circuit 70 which derives a limit voltage magnitude as shown in FIG. 1 from slip and synchronous frequency values.

The slip frequency signal $\Delta$, as shown, is applied through junction 51 to a multiplier circuit 52 which derives a signal equal to the square of the slip frequency that is $\Delta^2$ in Equation (5). Similarly, the synchronous frequency singal $\omega_s$ is applied through junction 53 to a multiplying circuit 54 which produces a signal equal to the square of the synchronous frequency that is $\omega_s^2$ in Equation (5). Further, both the synchronous and slip frequency signals are applied to a multiplying circuit 55 which produces a signal which is a product of the slip and synchronous frequencies. The outputs of multiplying circuits 52 and 54 are applied to multiplying circuit 56 which has an output equal to the product of the square of the synchronous frequency and to the square of the slip frequency. The output of multiplying circuit 52, that is, the square of the slip frequency, is applied to amplifier 62 whose amplification magnitude is equal to the coefficient of $\Delta^2$ in the numerator of Equation (5), i.e., $I_M^2R_s^2 n^2L_r^2$. Similarly, the output of the multiplying circuit 56 is the product of the squares of the slip frequency and the synchronous frequency and it is applied to amplifier 65 which has an amplification magnitude equal to the coefficient found in the numerator of Equation (5) of $\Delta^2\omega_s^2$, i.e., $I_M^2n^4(L_sL_r - M^2)^2$. The output of the multiplier 54, which is the square of the synchronous frequency, is applied to amplifier 64 which has an amplification magnitude equal to the coefficient of $\omega_s^2$ in the numerator of Equation (5), i.e., $I_M^2R_r^2n^2L_s^2$. The output of the multiplying circuit 55, the product of the synchronous and slip frequencies, is applied to amplifier 63 whose amplification magnitude is equal to the coefficient of $\omega_s \Delta$, in the numerator of Equation (5), i.e., $2n^2 M^2 R_s r_r I_M^2$.

The outputs of the amplifiers 62, 63, 64 and 65 are applied to a summing junction 66 which adds these outputs to a signal whose value is proportional to the constant term found in the numerator of Equation (5), that is, $R_s^2 R_r^2 I_M^2$. The output of summing junction 66 is applied to the numerator terminal of dividing circuit 68.

The output of multiplying circuit 52, $\Delta^2$, the square of the slip frequency, is applied to amplifier 67 whose value is proportional to the coefficient of $\Delta^2$ in the denominator of Equation (5), i.e., $n^2(M - L_r)^2$. The output of amplifier 67 is applied to summing junction 69 which adds this output to a signal equal to the constant term as found in the denominator of Equation (5), i.e., $R_r^2$. The output of summing junction 69 is applied to the denominator terminal of dividing circuit 68 which produces the square of Equation (5) by dividing the output of summing junction 66 by the output of summing junction 69.

In order to obtain a voltage magnitude, the square root of the square of the motor voltage in Equation (5), i.e., the right-hand term of Equation (5), must be obtained. Hence the output of dividing circuit 68 must be applied to circuit 72 which derives the square root of the output of dividing circuit 68. The output of the square root circuit 72 is a voltage value corresponding to magnitude of the motor voltage, i.e., the right-hand term of Equation (5).

Figure 5:
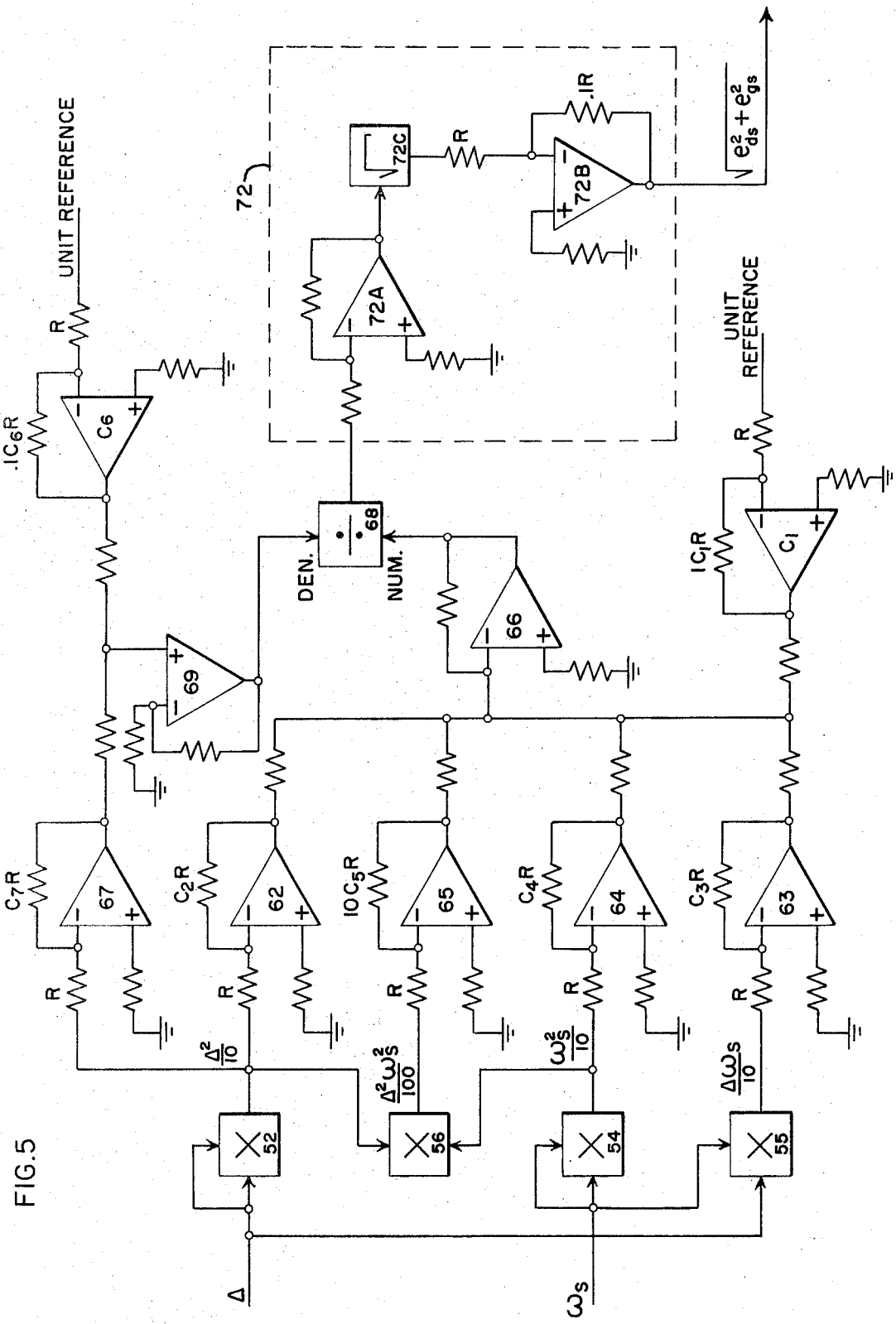
FIG. 5 is a schematic of the functional diagram, FIG. 4, illustrating block 70 of FIG. 1.

FIG. 5, a further implementation of the circuitry of FIG. 4, uses operational amplifiers and arithmetical function modules. Commercially available operational amplifiers 62, 63, 64, 65, 67, 72A, 73B, C1, and C6 are used in the classical voltage gain configuration. In such a configuration, the voltage gain is equal to the ratio of the feedback resistance to the input resistance. For example, amplifier 62 has a feedback resistance of $C_2R$ and an input resistance of R, thus the gain of amplifier 62 is the ratio of $C_2R$ to R or $C_2$. $C_2$ is, as defined in FIG. 4, $I_M^2 R_s^2 n^2 L_r^2$ which is determined from the motor's parameters. Operational amplifiers 66 and 69 are used in the classical summing amplifier configuration. The arithmetical function modules 52, 54, 55 and 56, also commercially available, are used in the analog multiplier configuration. Function module 68 is used as an analog divider and module 72 is used in the square root configuration.

The resistors used with the various operational amplifiers are values as recommended by the manufacturer to ensure proper device operations. Where operational amplifiers are used as voltage gain devices the relationship of the various resistors is indicated, the value of C being as defined in FIG. 4 and previously in the Specification. The function modules are of any convenient type such as Hybrid Systems Corporation, Transconductance Analog Multiplier/Divider Model 107C.

FIG. 1 shows that for normal motor operation the control synchronous frequency and the control voltage are applied directly to the motor drive circuitry. Both the voltage and frequency are limited independently to provide motor saturation protection without limiting the motor's torque capability. The region under Curve 1 in FIG. 3 is the area of non-saturated motor/generator operation. The frequency limiter reduces the total nonsaturated region to a region of useful motor/generator operation as illustrated by areas 4 and 4a in FIG. 3. Areas 4 and 4a are bounded on one side by the line of constant slip frequency, $\Delta_p$, as shown in FIG. 3. This constant slip frequency, $\Delta_p$, corresponds to maximum torque for any magnetizing current but can be selected at any smaller slip frequency if desired to limit the maximum torque produced or to take advantage of the efficiencies of operation possible at lower slip frequencies.

In the accelerate/decelerate mode the synchronous frequency is generated to correspond to the true rotor speed added to the constant flux pull-out torque slip frequency, $\Delta_p$. The voltage is generated to correspond to the voltage which produces the maximum, nonsaturating magnetizing current in the motor; thus the motor produces maximum accelerating/decelerating torque without saturation. The system and concepts as described hereinabove are applicable to both directions of rotation.

Having described and disclosed the system of this invention and an embodiment thereof, the scope of this invention is not limited to the invention of the embodiment described hereinabove and further modifications and applications or variations will occur to those who are skilled in the art. Therefore, such modifications, applications, and variations will not depart from the true spirit and scope of this invention as defined in the appended claims.

We claim:

1. Limiting apparatus for use in systems for control of rotating electrical machines wherein said system includes motor drive circuitry, means for producing and conducting a command voltage signal $E_C$, a command synchronous frequency signal $\omega_{sC}$, and a machine speed signal $\omega_r$, said apparatus comprising:
   a. a source of a programmable machine slip frequency limit signal $\Delta_p$;
   b. summing means responsive to the machine speed signal and to the slip frequency limit signal for producing the sum and difference of said signals ($\omega_r \pm \Delta_p$) to form respectively upper and lower synchronous frequency limit signals;
   c. electronic limiter circuitry responsive to said command synchronous frequency signal $\omega_{sC}$ and to said upper and lower synchronous frequency limit signals for producing a limited synchronous frequency signal $\omega_s$;
   d. a second summing means responsive to said machine speed signal $\omega_r$ and to said limited synchronous frequency signal $\omega_s$ for producing a signal representative of actual machine slip frequency $\Delta$;
   e. a voltage function generator responsive to said actual machine slip frequency $\Delta$ and to said limited synchronous frequency signal $\omega_s$ for producing a voltage limit signal $E_L$;
   f. additional electronic limiter circuitry responsive to said command voltage signal $E_C$ and to said voltage limit signal $E_L$ for producing a limited voltage signal E; and
   g. conducting means for supplying said limited synchronous frequency signal $\omega_s$ and said limited voltage signal E to said motor drive circuitry.

2. Limiting apparatus for use in systems for control of rotating electrical machines wherein said system includes motor drive circuitry, and control signal generating means for producing a command voltage signal $E_C$, a command synchronous frequency signal $\omega_{sC}$, and a machine speed signal $\omega_r$, said apparatus comprising:

a. a source of a programmable machine slip frequency limit signal $\Delta_p$;
b. a frequency limiter for limiting said command synchronous frequency signal $\omega_{sC}$ to form a synchronous frequency signal $\omega_s$ in the range of $\omega_r \pm \Delta_p$;
c. a limit value generator responsive to said synchronous frequency and machine speed signals $\omega_s$ and $\omega_r$ for producing a voltage magnitude limit signal $E_L$; an
d. a voltage limiter for limiting said command voltage signal to form a limited voltage signal E which does not exceed the voltage magnitude limit signal $E_L$.

3. The limiting apparatus of claim 2 wherein said signal $\Delta_p$ corresponds to the slip frequency for maximum torque of the machine and wherein said signal $E_L$ corresponds to the voltage that will cause the maximum non-saturating magnetizing current in the machine controlled.

4. Limiting apparatus for use in systems for control of rotating electrical machines wherein said system includes motor drive circuitry, means for producing and conducting a command voltage signal $E_C$, a command synchronous frequency signal $\omega_{sC}$, a slip frequency signal $\Delta_p$, and a machine speed signal $\omega_r$, said apparatus comprising:

a. electronic frequency limiter means responsive to said machine speed signal $\omega_r$ and to said slip frequency signal $\Delta_p$ for limiting said command synchronous frequency signal $\omega_{sC}$ to a synchronous frequency signal $\omega_s$ in the range of $\omega_r \pm \Delta_p$;
b. an electronic limit value generator responsive to said machine speed signal $\omega_r$ and to the synchronous frequency signal $\omega_s$ for generating a voltage magnitude limit signal $E_L$ as a function of the synchronous frequency signal $\omega_s$ and the difference between said signal $\omega_s$ and said machine speed signal $\omega_r$;
c. a voltage limiter responsive to said command voltage signal $E_C$ and to said voltage magnitude limit signal $E_L$ for limiting said command signal $E_C$ to limits established by said limit signal $E_L$ to produce a limited voltage signal E; and
d. conductor means for supplying said limited synchronous frequency signal $\omega_s$ and said limited voltage signal E to said motor drive circuitry as outputs of said limiting apparatus.

* * * * *